A. M. Utley,

Cheese Table.

No. 89,814.

Patented May 4, 1869.

WITNESSES:
Bailey
Wm H. McCabe

INVENTOR:
A. M. Utley
per A. Pollok
attorney.

United States Patent Office.

A. M. UTLEY, OF WATERTOWN, NEW YORK.

Letters Patent No. 89,814, dated May 4, 1869.

IMPROVEMENT IN CHEESE-TABLES, SHELVING, &c.

The Schedule referred to in these Letters Patent and making part of the same.

*To all whom it may concern:*

Be it known that I, A. M. UTLEY, of Watertown, in the county of Jefferson, and State of New York, have invented certain new and useful Improvements in Cheese-Tables, Shelvings, &c.; and I hereby declare the following to be a full, clear, and exact description of the same, reference being had to the accompanying drawings, in which—

Figure 1:
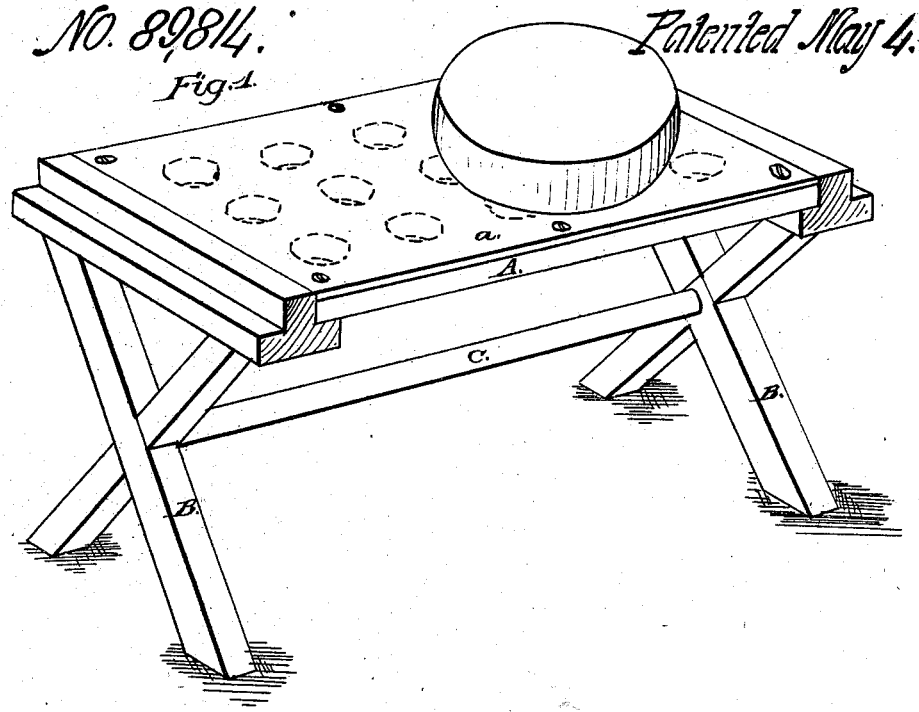
Figure 1 is a perspective view of a cheese-table made in accordance with my invention.
Figure 2:
Figure 2 is a longitudinal vertical section of the removable top of the table.

My invention relates to tables and shelving for supporting cheese during the process of curing, and its object is twofold:

First, to produce a better quality of cheese than can be done with ordinary curing-tables.

Second, to produce a curing-table which can be readily taken apart or put together whenever desired.

To this end, my invention consists—

First, in covering with paper the top of the table, range, turner, or shelf, upon which the cheese rests during the process of curing.

The old method of curing cheese on wooden tables, or turners, is open to the objection that the wood will not absorb with sufficient rapidity the moisture from the cheese, nor retain the gases in the cheese, while whatever moisture the wood does absorb will, in a short time, produce mould. By reason of this, the cheese becomes more or less impregnated with an unpleasant odor and taste, and is of not so good quality as it otherwise would be.

The paper covering, however, which I employ is an absorbent, which will quickly take from the cheese all superfluous moisture, preventing at the same time all formation of mould, and causing the cheese to be rapidly and perfectly cured.

In order to carry off the moisture absorbed by the cheese, I form in the wood, or other material upon which the paper covering is laid, a series of perforations, from which the moisture can escape, and a free circulation of air or moisture under the table or shelf will aid also in bringing the cheese to good condition.

Thus, the advantages gained by the method of curing I contemplate are many and important, for the superfluous moisture is quickly absorbed and carried off; the gases are retained, which is important for the more perfect curing of the cheese during the state of fermentation; the curing is effected rapidly, the flavor and richness of the cheese is increased, and moulding is prevented.

My invention further consists in combining the table-top, legs, and supporting-brace or braces, in the manner hereinafter specified, so that said parts may be readily put together, or taken apart and stored away, when their services are no longer required.

A table of this kind is very essential in a dairy, as it can be put out of the way when not required for immediate use, thus leaving at all times ample room.

In the drawings, I have represented, in illustration of my invention, a curing-table, the top of which is composed of wood, A, over which is a covering of paper, $a$, of the required thickness, applied in a suitable manner.

Upon this paper base the cheese rests during the process of curing, the advantages above specified being the result of this method.

The moisture absorbed by the paper may be carried off in any suitable way. I prefer to form in the wood top, and underneath the paper, perforations $b$, which allow the moisture to escape freely.

This paper covering may be applied to any suitable curing-table or shelving, with or without the perforations, or to any ordinary or suitable apparatus used for curing or turning cheese during the process of curing, or the whole top, if desired, may be formed of paper.

The advantages are manifold, and result in a great improvement in the manufacture of cheese.

The table is supported so as to be capable of sliding in ways or recesses, $c$, formed for it in the upper ends of the crossed uprights B, so that it can be removed therefrom whenever desired; and for a like reason, I connect and support the two uprights B by means of a cross-bar, C, each end of which fits and is held in a socket or hole formed at the point where the two legs, which compose each upright, cross each other.

The frame and top, when the apparatus is not required for use, can thus be taken apart and stowed away into a small space, economizing room, and leaving the dairy as open and free from impediment as possible.

Having now described my invention, and the manner in which the same is or may be carried into effect,

What I claim, and desire to secure by Letters Patent, is—

1. Forming that portion of the table, shelf, or other device upon which the cheese rests, and with which it is in contact during the process of curing, of paper, substantially as and for the purposes set forth.

2. A table-top, shelf, or its equivalent, for supporting the cheese during curing, composed of a perforated wooden base, provided with a paper covering, substantially as shown and set forth.

3. The combination of the removable table-top or shelf, the grooved uprights for supporting the same, and the detachable cross-bar connecting said uprights, constructed and arranged substantially as and for the purposes specified.

In testimony whereof, I have signed my name to this specification, before two subscribing witnesses.

A. M. UTLEY.

Witnesses:
 JNO. C. McCARTIN,
 D. P. SMITH.